(12) United States Patent
Walz et al.

(10) Patent No.: US 9,486,719 B2
(45) Date of Patent: Nov. 8, 2016

(54) FILTER ELEMENT, DEVICE FOR FOLDING A FILTER MEDIUM WEB AND PROCESS FOR PRODUCING A ZIGZAG-FOLDED FILTER ELEMENT

(71) Applicant: MANN+HUMMEL GMBH, Ludwigsburg (DE)

(72) Inventors: Stefan Walz, Freiberg (DE); Mario Keller, Winnenden (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 14/219,164

(22) Filed: Mar. 19, 2014

(65) Prior Publication Data

US 2014/0202123 A1     Jul. 24, 2014

Related U.S. Application Data

(63) Continuation of application No. PCT/EP2012/066068, filed on Aug. 17, 2012.

(30) Foreign Application Priority Data

Sep. 19, 2011   (DE) .................. 10 2011 113 649

(51) Int. Cl.
| | |
|---|---|
| *B01D 46/00* | (2006.01) |
| *B01D 29/01* | (2006.01) |
| *B01D 46/52* | (2006.01) |
| *B01D 29/11* | (2006.01) |
| *B01D 29/21* | (2006.01) |

(52) U.S. Cl.
CPC ........... *B01D 29/016* (2013.01); *B01D 29/111* (2013.01); *B01D 29/21* (2013.01); *B01D 46/521* (2013.01); *B01D 46/523* (2013.01); *B01D 2201/127* (2013.01)

(58) Field of Classification Search
CPC ............ B01D 46/521–46/523; B01D 29/016; B01D 29/21; B01D 29/111; B01D 2201/127

USPC ......... 55/486–487, 497, 501, 521, 524, 588; 210/493.5; 493/416
See application file for complete search history.

(56) References Cited

U.S. PATENT DOCUMENTS

| | | | | |
|---|---|---|---|---|
| 5,064,598 | A | * | 11/1991 | Seiler ............................. 264/230 |
| 5,089,202 | A | | 2/1992 | Lippold |
| 5,609,761 | A | | 3/1997 | Franz |
| 2005/0139544 | A1 | * | 6/2005 | Choi ........................... 210/493.1 |
| 2012/0024774 | A1 | | 2/2012 | Wyhler |
| 2013/0008849 | A1 | * | 1/2013 | Gehwolf .............. B01D 46/522 |
| | | | | 210/493.5 |

FOREIGN PATENT DOCUMENTS

| | | | |
|---|---|---|---|
| DE | 19735993 | A1 | 2/1999 |
| DE | 19920983 | A1 | 11/2000 |

OTHER PUBLICATIONS

Search report of PCT/EP2012/066068, dated Nov. 2, 2012.

* cited by examiner

*Primary Examiner* — Heidi Kelley
*Assistant Examiner* — Karla Hawkins
(74) *Attorney, Agent, or Firm* — James Hasselbeck (57) ABSTRACT

A filter element has a multi-layered filter medium web with several layers that is folded along folding lines. The filter medium web has at least one functional region in at least one section located between adjacent folding lines. The at least one functional region is a first embossment. The layers of the filter medium web are firmly bonded to each other along the first embossment. A device for folding a multi-layered filter medium web has an energy-introducing embossing unit that embosses the filter medium web fed by a feed unit to the embossing unit. A folding unit for folding the filter medium web along folding lines is provided. The energy-introducing embossing unit embosses and firmly bonds the layers of the filter medium web along at least one functional region in at least one section of the filter medium web located between adjacent folding lines.

12 Claims, 7 Drawing Sheets

FILTER ELEMENT, DEVICE FOR FOLDING A FILTER MEDIUM WEB AND PROCESS FOR PRODUCING A ZIGZAG-FOLDED FILTER ELEMENT

CROSS-REFERENCE TO RELATED APPLICATIONS

This application is a continuation application of international application No. PCT/EP2012/066068 having an international filing date of 17 Aug. 2012 and designating the United States, the international application claiming a priority date of 19 Sep. 2011, based on prior filed German patent application No. 10 2011 113 649.9, the entire contents of the aforesaid international application and the aforesaid German patent application being incorporated herein by reference.

BACKGROUND OF THE INVENTION

The invention relates to a filter element, in particular for an internal combustion engine, in particular of a motor vehicle, comprising a filter medium made from a medium web that consists of a plurality of layers and is folded along folding lines.

The invention further relates to a device for folding a web-shaped filter medium of a filter element, in particular for an internal combustion engine, in particular of a motor vehicle, comprising a feed unit for the web-shaped filter medium, comprising an energy-introducing embossing unit, in particular an ultrasonic embossing unit, for embossing the web-shaped filter medium, and comprising a folding unit for folding the web-shaped filter medium along folding lines.

The invention further relates to a method for producing a zigzag-folded filter element made from a web-shaped filter medium, in particular for an internal combustion engine, in particular of a motor vehicle, in which the web-shaped filter medium is fed via a feed unit to an energy-introducing embossing unit, in particular an ultrasonic embossing unit, by means of which the web-shaped filter medium is embossed, and the filter medium is folded along folding lines by means of a folding unit.

From WO 2010/106087 A1, a filter element is known that serves for removing particles from a fluid flow, in particular particles from a fuel flow of an internal combustion engine. The filter element comprises an upper end disk, a lower end disk and a ring-shaped filter medium arranged therebetween that is folded in a star-shaped manner. For production, a multi-layered, web-shaped filter medium is used that is folded so as to form the filter element. In the case of the web-shaped filter medium, in particular, the individual layers lie loosely on top of each other. The filter medium is fed by means of a feed unit to a heat-introducing embossing unit, in particular ultrasonic embossing unit, which embosses folding lines into the filter medium. The filter medium is subsequently folded along the folding lines by means of a folding device. During embossing, the layers of the multi-layered filter medium are welded along the folding lines by means of the heat-introducing embossing unit.

It is an object of the invention to configure a filter element, a device, and a method of the aforementioned kind, by means of which the layers of the web-shaped filter medium can be connected to each other and folded in a simple and precise manner, and wherein the finish folded filter element has an even higher stability and filtering efficiency.

SUMMARY OF THE INVENTION

This object is achieved according to the invention in that the filter medium has embossments in at least one section between adjacent folding lines so as to form at least one further functional region, and the layers of the multi-layered filter medium web are firmly bonded (fused) to each other along the embossments of the at least one functional region.

According to the invention, the filter medium is therefore embossed and provided with embossments in at least one section so as to form another functional region. The layers of the multi-layered filter medium web can be layers of different or identical materials. Moreover, the layers of the at least one further functional region are firmly bonded to each other. By means of the firmly bonded connections, in particular welded, fused or adhesively bonded connections, the connection partners are held together by atomic or molecular forces. The firmly bonded (fused) connections are durable and robust with respect to environmental influences. By means of the embossment and the additional firmly bonded (fused) connection, the stability of the filter medium in the folded state is increased. Furthermore, by the combination of embossment and firmly bonded (fused) connection, the functionality of the filter element, in particular the filtration efficiency and/or the service life and/or the stability and/or a pressure difference between the clean side and the dirty side of the filter medium is improved. Due to the fact that firmly bonded (fused) connections are arranged only in the region of the embossments, while in other sections the layers can lie loosely next to each other, the total area of the filter medium that could be affected by embossments and connections with regard to fluid flow can be kept at a minimum. In this manner, the filter medium area that is active for filtration is optimized. Furthermore, embossing and firmly bonding can advantageously be carried out in a single process step so that production costs can be reduced. By means of the combination of embossment and firmly bonded (fused) connection, it is furthermore possible to combine different filter layers, in particular of different materials and/or different structure and/or different dimensions, with each other. Advantageously, two and more layers can be embossed and firmly bonded to each other.

In an advantageous embodiment, the folding lines can be embossed (second embossments) and the layers of the multi-layered filter medium can be firmly bonded to each other along the second embossments. By embossing the folding lines, the folding action can be improved, in particular can be simplified and can be made more precise. By means of the second embossments and the additional firmly bonded (fused) connection along the folding lines, stability of the filter medium in the folded state can be further increased. Alternatively, the folding lines can advantageously be embossed without being connected in a firmly bonding manner. Advantageously, a firmly bonded (fused) connection can also be implemented without embossing the folding lines.

In another advantageous embodiment, the at least one further functional region can be a spacer knob and/or stabilizing knob. With the at least one spacer knob, the flat sections that are adjacent to each other when the filter medium is folded can be kept spaced apart from another. In this manner, the flat sections can be prevented from resting directly against each other, which would affect the flow passing through the filter medium. Advantageously, at least one spacer knob can be provided in each section or every other section. Furthermore, advantageously, a plurality of spacer knobs can be provided between two adjacent folding lines. Furthermore, advantageously, spacer knobs that correspond to each other and are mirrored at a respective plane that contains a fold line and runs perpendicular to the non-folded filter medium web can be configured in adjacent sections. The mirrored spacer knobs can rest against each other when the filter medium is folded. In this manner, maintaining clearance can be improved. Advantageously, the at least one spacer knob can have the shape of a half cylinder shell. As an alternative, advantageously, the at least one spacer knob can have the shape of a half cone shell. This has the advantage that the spacer knob can adapt to the tapered shape of the folds when the filter medium is folded. Thus, the spacer knob can rest over its length against the opposite fold surface or against another spacer knob located approximately opposite thereto. The axis of the cylinder shell or the cone shell can advantageously run perpendicular to the folding lines. Furthermore, the at least one spacer knob can stabilize the flat section in which said spacer knob is arranged.

In another advantageous embodiment, the layers of the multi-layered filter medium can be laminated, calendered, welded, fused or glued along the at least one embossment. In this manner, a simple firmly bonded (fused) connection can be implemented between the layers.

Advantageously, the filter medium can be folded in a zigzag-shaped manner. A filter medium folded in a zigzag-shaped manner can easily be formed into a closed filter element, in particular a round filter element. Alternatively, a zigzag-folded filter element can easily be formed into a flat filter element.

Furthermore, advantageously, at least one, preferably two of the layers of the multi-layered filter medium can be made from a synthetic material. Synthetic materials can be embossed in a simple manner by means of energy-introducing embossing methods and can be firmly bonded to each other at the same time, or can also be bonded to other materials, even to non-synthetic materials. Synthetic materials can be robust. With synthetic materials, a long service life can be achieved. They can be produced and recycled in a simple manner.

Advantageously, at least one of the layers of the multi-layered filter medium can comprise a mesh, preferably a plastic mesh. Meshes increase the stability of the filter medium. Plastic can easily be heated and embossed with the energy-introducing embossing unit, and can be firmly bonded, in particular welded, to the remaining layers.

Furthermore, advantageously, at least one of the layers of the multi-layered filter medium can comprise a meltblown layer. Due to the three-dimensional storage structure of the meltblown layer, very good filtration efficiency can be achieved, which can increase the service life of the filter element. Meltblown layers can be shaped, embossed, and firmly bonded, in particular welded, in a simple manner.

In another advantageous embodiment, the layers can be embossed and firmly bonded to each other by means of an energy-introducing method, in particular by means of ultrasonic embossing. With an energy-introducing method it is possible in a simple manner to implement the embossment and the firmly bonded (fused) connection at the same time.

In one embodiment of the filter medium, a prefilter layer and a fine filter element can be joined together in the flow direction, wherein on the dirty side of the prefilter layer, a first support layer can be applied, and on the clean side of the fine filter layer, a second support layer can be applied for absorbing the longitudinal and/or transverse forces in the case of tensile or compressive load, wherein each of the two support layers can have different maximum tensile forces in the longitudinal or transverse direction. Here, longitudinal direction is defined as the direction in which the particularly web-shaped and preferably rectangular filter medium has its greatest length, which is in particular the feed direction during the production of the filter medium. Transverse direction is defined as the direction that runs along the width of the filter medium perpendicular to the longitudinal direction, and along which the filter medium is preferably folded. The different strengths have the advantage that they compensate in the longitudinal and transverse directions the length difference of the outer layers about the neutral layer in the middle during potential deflections during the lamination, roll-cutting, embossing, and set-up process, and thereby improve processability or, in certain media configurations, make it possible in the first place. The stiffness which is necessary for the connection of the bellows and the end disk of the filter, and which is required when welding the filter medium to the thermoplastic end disk, or when dipping the filter medium into a viscous adhesive is advantageously achieved by means of the support layer for absorbing the transverse forces.

Furthermore, in corresponding embodiments, the support layers can advantageously fulfill the function of draining so as to prevent the filter medium from sticking together. Another advantage of the support layers is the possibility that the folds can be arranged "back to back" since, due to the support layers thus resting against each other, flow-through is ensured.

During measurements for determining properties in the case of tensile load, generally, the width-related breaking force is determined according to DIN EN ISO 1924-2, in each case separately for the machine direction (longitudinal direction) and the transverse direction, based on the following equation:

$$\sigma_T^b = \frac{F_t}{b}$$

wherein $F_t$ indicates the mean value of the maximum tensile force in Newton, and b indicates the initial width of the sample in millimeters. According to standard, b=15 mm and the length of the sample is at least 180 mm. For determining the mean maximum tensile force, at least 10 tensile tests are required. Hereinafter, as a material parameter, the mean value of the maximum tensile force is expressed in Newton $F_t$. Since according to the standard, the width b of 15 mm is defined as a fixed test parameter, the width-related breaking force can be calculated based thereon at any time.

The width-related bending stiffness S, determined according to DIN 53121, is used hereinafter as a further material parameter. The standard specification specifies different measuring methods; preferably, a rectangular sample with the width b is clamped along a width, and, at a distance l from the clamping point, is loaded with a force F, resulting in a maximum deflection f as a displacement of the force application point. The width-related bending stiffness S is calculated therefrom as $$S = \frac{F}{f} * \frac{l^3}{3b}.$$

In one embodiment, the maximum mean tensile force of the filter medium's support layer that absorbs the transverse force can be greater than 10 N in the longitudinal direction.

In an advantageous embodiment, the mean maximum tensile force of the filter medium's support layer that absorbs the transverse forces can be greater than 20 N in the transverse direction.

In one embodiment, the mean maximum tensile force of the filter medium's support layer that absorbs the longitudinal forces can be greater than 20N in the longitudinal direction.

In an advantageous embodiment, the maximum average tensile force of the filter medium's support layer that absorbs the longitudinal forces can be greater than 10 N in the transverse direction.

In one embodiment, the width-related bending stiffness of the filter medium's support layer that absorbs the transverse forces can be greater than 0.1 N·mm, in particular greater than 0.15 N·mm in the longitudinal direction.

In one embodiment, the width-related bending stiffness of the filter medium's support layer that absorbs the transverse forces can be greater than 0.3 N·mm, in particular greater than 0.4 N·mm in the transverse direction.

In an advantageous embodiment, the width-related bending stiffness of the filter medium's support layer that absorbs the longitudinal forces can be greater than 0.3 N·mm, particularly preferred greater than 0.45 N·mm in the longitudinal direction.

In one embodiment, the width-related bending stiffness of the filter medium's support layer that absorbs the longitudinal forces can be greater than 0.1 N·mm, particularly preferred greater than 0.15 N·mm in the transverse direction.

In one embodiment, each of the supports layers can be configured in the form of a mesh that can have crossing threads, wherein the crossing threads can span a thread angle.

In one embodiment, the thread angle of the filter medium's support layer responsible for absorbing the transverse forces can be in the range of from 70° to 120°, preferably in the range of from 80° to 100°, particularly preferred at 90°.

In one embodiment, the thread angle of the filter medium's support layer responsible for absorbing the longitudinal forces can be in the range of from 40° to 80°, in particular in the range of from 50° to 70°.

In one embodiment, the prefilter layer of the filter medium can be formed from a meltblown layer with a thickness in the range of from 0.1 mm to 1 mm and a weight per unit area in the range of from 10 g/m² to 200 g/m².

In one embodiment, the thickness of the meltblown layer of the filter medium can range between 0.2 mm and 0.4 mm, and the weight per unit area can range between 90 g/m² and 110 g/m².

In one embodiment, the fiber diameter of the prefilter layer and/or of the fine filter layer of the filter medium can be in the range of from 0.1 µm to 10 µm.

In one embodiment, the prefilter layer and/or the fine filter layer of the filter medium can be produced from materials selected from the group consisting of polybutylene terephthalate (PBT) meltblown, polyamide (PA) meltblown, polypropylene (PP) meltblown and polyether sulfone (PES) meltblown.

In one embodiment, the fine filter layer of the filter medium can be formed from a meltblown layer with a thickness of from 0.1 mm to 1.5 mm and a weight per unit area in the range of from 10 g/m² to 200 g/m².

In one embodiment, the thickness of the meltblown layer of the filter medium can range between 0.6 mm and 1.0 mm, and the weight per unit area can range between 90 g/m² and 110 g/m².

In one embodiment, the filter medium can additionally comprise a third filter layer.

In one embodiment, the third filter layer of the filter medium can be formed from a meltblown layer with a thickness in the range of from 0.1 to 1 mm and a weight per unit area in the range of from 10 g/m² to 100 g/m².

In one embodiment, the thickness of the meltblown layer of the filter medium can range between 0.2 mm and 0.4 mm, and the weight per unit area can range between 30 g/m² and 60 g/m².

In one embodiment, the third filter layer of the filter medium can be produced from materials selected from the group consisting of polybutylene terephthalate (PBT) meltblown, polyamide (PA) meltblown, polypropylene (PP) meltblown and polyether sulfone (PES) meltblown.

In one embodiment, the fiber diameter of the third filter layer can be in the range of from 0.1 µm to 10 µm.

In one embodiment, the third filter layer can be formed as an absolute separator.

In one embodiment, the support layers and/or the fine filter layer and/or the prefilter layer can consist of a combination selected from the group consisting of mesh-spunbond, spunbond-spunbond, spunbond-filter layers and mesh-filter layers. The spunbond can be a spunbond nonwoven.

In one embodiment, the filter layers and/or the fine filter layers and/or the prefilter layer can consist of a dried nonwoven, in particular carded nonwoven, and/or of a wet nonwoven.

In one embodiment, a filter layer and/or fine filter layer and/or prefilter layer can be produced from materials selected from a group consisting of synthetic polymers, preferably polybutylene terephthalate (PBT), polyamide (PA), polyether sulfone (PES), polyethylene terephthalate (PET), and/or from natural polymers and/or mixtures thereof.

The object in accordance with the device is further achieved according to the invention in that the energy-introducing embossing unit is configured for embossing and for firmly bonding layers of the multi-layered filter medium along at least one functional region in at least one section of the filter medium between adjacent folding lines. The features and advantages listed above in connection with the filter element according to the invention apply correspondingly to the device and the advantageous configurations thereof, and vice versa.

Thus, according to the invention, the energy-introducing embossing unit is configured such that it simultaneously embosses the filter medium and firmly bonds, in particular welds or fuses, the layers to each other. Thus, the filter medium is laminated along the at least one further functional region so as to be durable, in particular, robust with respect to environmental influences. In this manner, the stability of the filter medium in the folded state is increased. Moreover, the defined and stable connection of the layers facilitates and improves the subsequent folding. In particular, the layers are welded together in such a manner that the bond strength at the connecting or welding lines of the layers is at least as high as the material strength within the individual layers.

Advantageously, the energy-introducing embossing unit can be configured for embossing the folding lines and/or for firmly bonding the layers of the multi-layered filter medium along the folding lines. In this manner, folding can be further facilitated and improved.

Preferably, an ultrasonic embossing unit can be used as an energy-introducing embossing unit. However, as an alternative, energy can also be introduced by means of a thermocalender, a laser or other energy sources.

In an advantageous embodiment, it can be provided that layers of the multi-layered filter medium are not connected to each other prior to embossing. Thus, a preceding operation for connecting, in particular, laminating the layers can be dispensed with. Up to the embossing process, the layers are stress-free and rest as separate layers flat against each other and can be displaced relative to each other. Stress between the layers that can occur during embossing and folding is thus compensated in a simple manner. This simplifies the embossing process and the folding process.

In another advantageous embodiment, a set-up unit for zigzag-shaped folding of the web-shaped filter medium can be arranged downstream of the energy-introducing embossing unit. The filter medium can be folded with the set-up unit immediately after embossing and firmly bonding, in particular welding or fusing. Thus, after each embossing of a fold line, the layers can align themselves to each other so as to relieve stresses, whereby the folding process is further simplified and precision is increased.

In another advantageous embodiment, the energy-introducing embossing unit can comprise an anvil roller with embossing strips, an ultrasonic sonotrode, and an embossing punch which is in particular at least partially formed together with the sonotrode. In this manner, with a simple continuous method, the web-shaped filter medium can be embossed and welded in a single work step. Advantageously, a different kind of energy-introducing embossing unit, in particular an embossing unit with an ultrasonic punch that moves together with the web-shaped filter medium or with a rotating ultrasonic sonotrode roller, can also be used.

Advantageously, upstream and downstream of the anvil roller in transport direction of the filter medium, a nip roller, in particular a driven nip roller can be arranged in each case. The positions of the nip rollers relative to the anvil roller can be changed so as to adjust an infeed angle and an outfeed angle across the anvil roller. Furthermore, driven nip rollers can serve for transporting the filter medium webs. Advantageously, the speed of the nip rollers can be adjusted. The nip rollers can be adapted in terms of position and/or speed to the properties of the filter medium web, in particular to the material composition, layer thicknesses and/or dimensions so as to enable optimal embossing and firmly bonding, in particular welding or fusing.

Furthermore, with regard to the method according to the invention, the object is achieved in that layers of the multi-layered filter medium are embossed, and are firmly bonded during embossing, with the energy-introducing embossing unit along at least one functional region in at least one section of the filter medium between adjacent folding lines. Advantageously, it is additionally possible with the energy-introducing embossing unit to emboss the folding lines into the web-shaped filter medium and/or to firmly bond the layers of the multi-layered filter medium along the folding lines. The features and advantages listed above in connection with the filter element according to the invention apply correspondingly to the method and the advantageous configurations thereof, and vice versa.

In an advantageous configuration of the method, the filter medium can be embossed and firmly bonded, in particular welded or fused, by means of an anvil roller with embossing strips, an ultrasonic sonotrode, and an embossing punch which is in particular at least partially formed together with the sonotrode.

Advantageously, after embossing and firmly bonding, in particular welding or fusing, the multi-layered filter medium can be folded in a zigzag-shaped manner using a set-up unit.

BRIEF DESCRIPTION OF THE DRAWINGS

Further advantages, features, and details of the invention are apparent from the following description in which exemplary embodiments of the invention are explained in greater detail with reference to the drawing. The person skilled in the art will expediently consider the features disclosed in combination in the drawing, the description, and in the claims also individually and combine them to other meaningful combinations.

In the Figures, the same components are referenced with the same reference numerals.

PREFERRED EMBODIMENTS OF THE INVENTION

Figure 1:
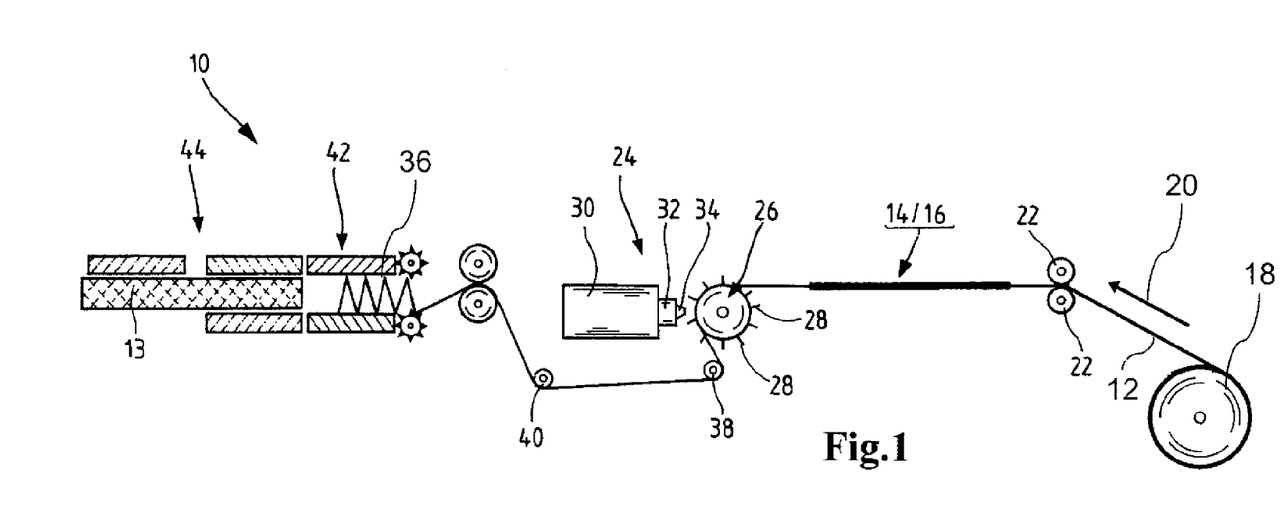
FIG. 1 shows schematically a device according to a first exemplary embodiment for zigzag-shaped folding of a three-layered filter medium web.

FIG. 1 shows a device 10 for zigzag-shaped folding of a multi-layered filter medium web 12 of a filter element 13.

The filter element 13 is used for filtering liquid or gaseous fluids, for example engine oil, fuel, combustion air or compressed air, in motor vehicles.

Figure 2:
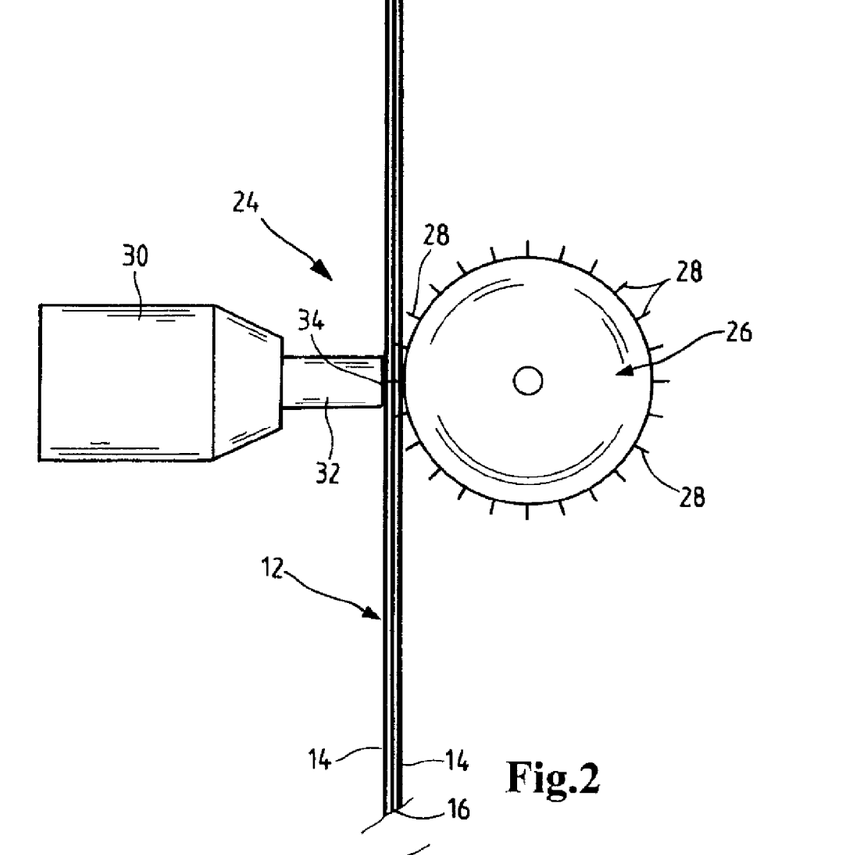
FIG. 2 shows schematically a detail view of an ultrasonic embossing unit of the device of FIG. 1.
Figure 3:
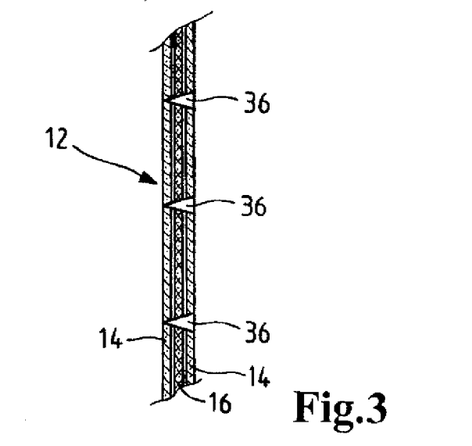
FIG. 3 shows schematically a detail view of the filter medium web embossed and welded with the ultrasonic embossing unit of FIG. 2.

As shown in FIGS. 2 and 3, the filter medium web 12 consists of three layers or plies which, in first instance, rest loosely on each other. The two outer layers consist of plastic meshes 14. Between the plastic meshes 14, a meltblown layer 16 is arranged which forms the middle layer. In alternative embodiments, two or more layers are provided.

The endless filter medium web 12 is unwound in the conveying direction, indicated by an arrow 20, by a roller 18 and is fed through two transport rollers 22. The filter medium web 12 is fed to an ultrasonic embossing unit 24 without being specifically heated in advance.

The ultrasonic embossing unit 24 comprises an anvil roller 26 which is equipped on its circumference with a multiplicity of embossing strips 28. The embossing strips 28 are arranged, distributed evenly spaced apart, along the circumference of the anvil roller 26. The embossing strips 28 can also be arranged so as to be distributed unevenly spaced apart along the circumference of the anvil roller 26. Each of the embossing strips 28 extends axial to the anvil roller 26 in radial direction. The width of the embossing strips 28 in the circumferential direction is in each case approximately 0.5 mm to 2 mm. The radially outer surfaces of the embossing strips 28 are smooth. By means of uneven spacing between the embossing strips 28, varying fold heights can be implemented.

Furthermore, the ultrasonic embossing unit 24 has an ultrasonic unit 30 by means of which ultrasound is introduced into a sonotrode 32 in a manner that is not of interest here. The ultrasonic unit 30 with the sonotrode 32 is located next to the anvil roller 26. The sonotrode 32 forms an embossing punch which interacts with the embossing strips 28 of the anvil roller 26.

The filter medium web 12 is moved through the anvil roller 26 and the sonotrode 32. Upstream of the anvil roller 26, viewed in the transport direction 20, the plastic mesh 14 and the meltblown layer 16 can move relative to each other. In this manner, mechanical stress between the layers is relieved.

Figure 4:
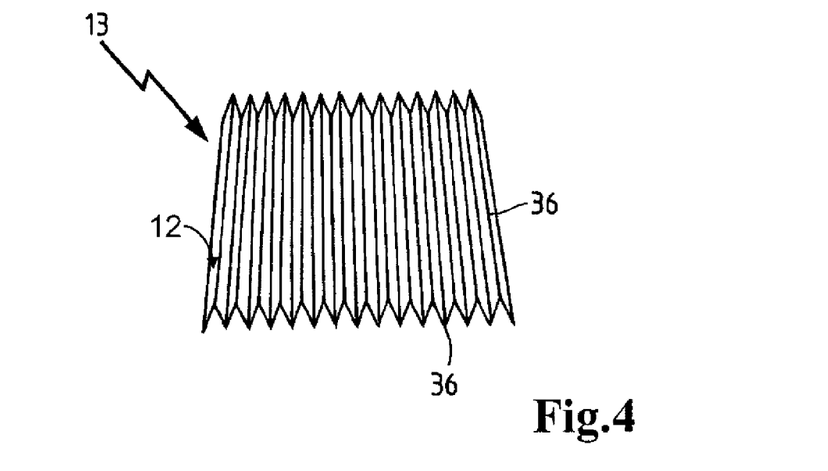
FIG. 4 shows an isometric illustration of a filter element folded in a zigzag-shaped manner produced with the device of FIG. 1, according to a first exemplary embodiment.
Figure 5:
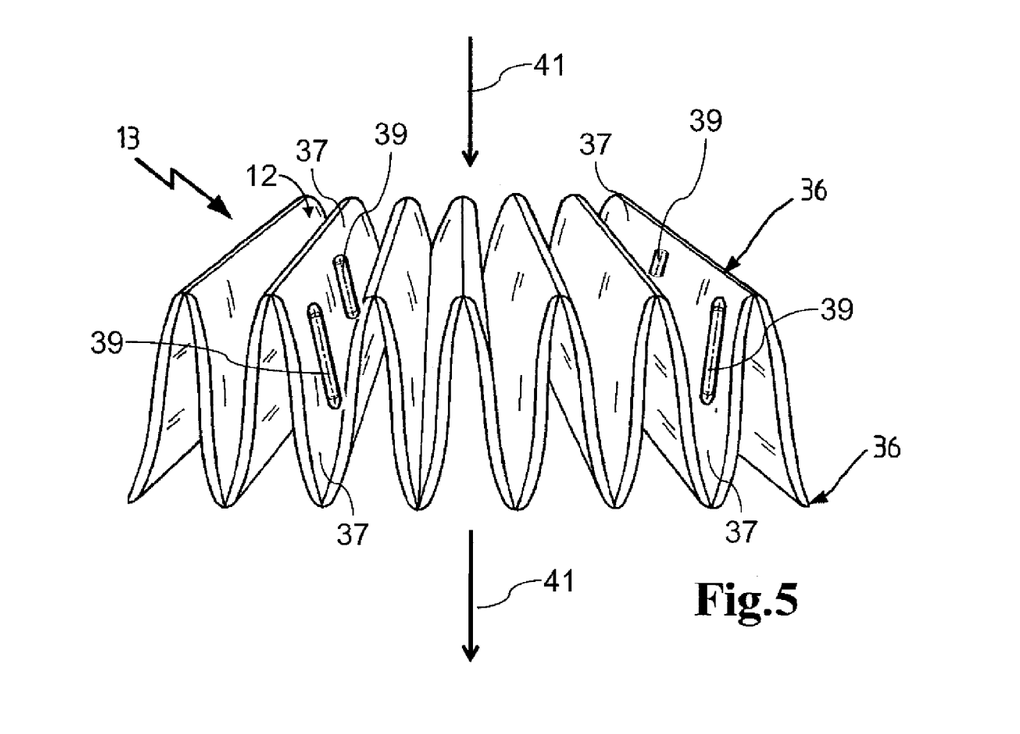
FIG. 5 shows a detailed view of the filter element of FIG. 4.

During the transport of the filter medium web 12 through the ultrasonic embossing unit 24, introducing ultrasound at a tip 34 of the sonotrode 32 results in heating of the filter medium web 12 in the regions defined by the embossing strips 28. The regions embossed in this manner form folding lines 36 for the subsequent folding of the filter medium web 12. The folding lines 36 are shown in detail in FIG. 3, and in the FIGS. 4 and 5 they are shown on a finished filter element 13. A flow direction of the fluid to be cleaned by the filter element 13 is indicated in FIG. 5 by arrows 41. The inflow side, thus the dirty side of the filter element 13, is located at the top in FIG. 5. The outflow side, thus the clean side of the filter element 13, is at the bottom in FIG. 5.

The heights of the embossing strips 28 in the radial direction, the spacing between the tip 34 of the sonotrode 32 and the embossing strips 28, and the energy emitted onto the filter medium web 12 by means of the sonotrode 32 are adapted to the properties of the filter medium web 12, for example, the type of material, the layer thicknesses, and the total thickness, so as to weld or fuse and thus firmly bond, simultaneously with the embossing process, the plastic meshes 14 and the meltblown layer 16 with the sonotrode 32 along the fold line 36.

Furthermore, during the transport of the filter medium web 12 through the ultrasonic embossing unit 24, the tip 34 of the sonotrode 32 is guided along the filter medium web 12 for embossing spacer knobs 39 in the flat sections 37 between adjacent folding lines 36. By introducing ultrasound at the tip 34 of the sonotrode 32, the plastic meshes 14 and the meltblown layer 16 are welded during embossing of the spacer knobs 39 and thus are firmly bonded. FIG. 5 shows only four of the spacer knobs 39 as an example. In reality, as shown in FIG. 8, a plurality of spacer knobs 38 are arranged in each section 37.

Figure 8:
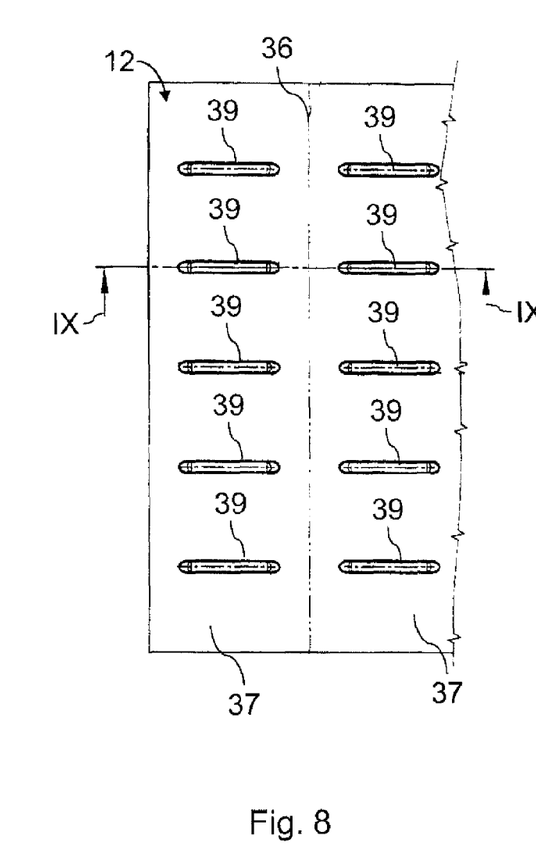
FIG. 8 shows a detail of the filter medium web of FIGS. 1 to 7 in a top view.
Figure 9:
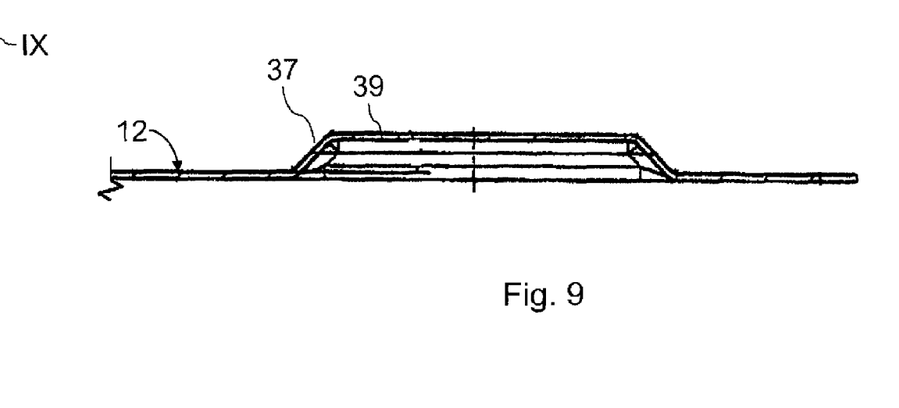
FIG. 9 shows a section of the filter medium web of FIG. 8 along the section line IX-IX in FIG. 8.

FIG. 8 shows a detail of the filter medium web 12 in a top view. FIG. 9 shows one of the spacer knobs 39 in cross-section. In each section 37 between two of the folding lines 36 in each case, a plurality of spacer knobs 39 are arranged. The spacer knobs 39 in section 37 are arranged next to each other in the transverse direction of the filter medium web 12, thus in the direction of the folding lines 36. Each of the spacer knobs 39 has the shape of a half cylinder shell. The virtual axis of the cylinder shell lies approximately in the plane of the respective section 37. Said axis runs transverse to the folding lines 36. The spacer knobs 39 are identical in terms of shape and dimensions. However, different spacer knobs 39 can also be provided.

The spacer knobs 39 can be arranged at any angle between 0° and 135° to the folding lines 36, preferably in the range of 90°±45°.

In adjacent flat sections 37 of the filter medium web 12, the surfaces of which face each other during folding, the spacer knobs 39 are in each case arranged mirrored in pairs along the fold line 36 lying therebetween. When the filter medium webs 12 are folded, the elevations of corresponding mirrored spacer knobs 39 rest against each other and keep the fold surfaces spaced apart from each other.

Between the folding lines 36 and the spacer knobs 39, the plastic meshes 14 and the meltblown layer 16 are not connected to each other and can still align themselves relative to each other. Mechanical stress in the embossed and welded filter medium webs 12 thus can be relieved in a simple manner during the later folding process so that undesirable wrinkling between the folding lines 36 is avoided, and the folding process takes place in a simpler and more precise manner. Moreover, it is avoided in this manner that the plastic meshes 14 and the meltblown layer 16 are lifted off and detached from each other during the folding process. Using a single sonotrode 32 helps avoid mechanical stresses and wrinkles in the filter medium web 12.

In the conveying direction downstream of the ultrasonic embossing unit 24, the embossed and welded filter medium web 12 is fed at room temperature via a deflection roller 38 and a deflection roller 40 to a set-up unit 42. In the set-up unit 42, the filter medium web 12 is folded into a zigzag shape in a manner that is not of interest here, and is cut into filter elements 13.

Subsequently, the filter elements 13 are fed to a fold tip heater 44, which is not of interest here, and are heated.

Folding speeds of 700 folds per minute and more can be achieved with the device 10.

Figure 6:
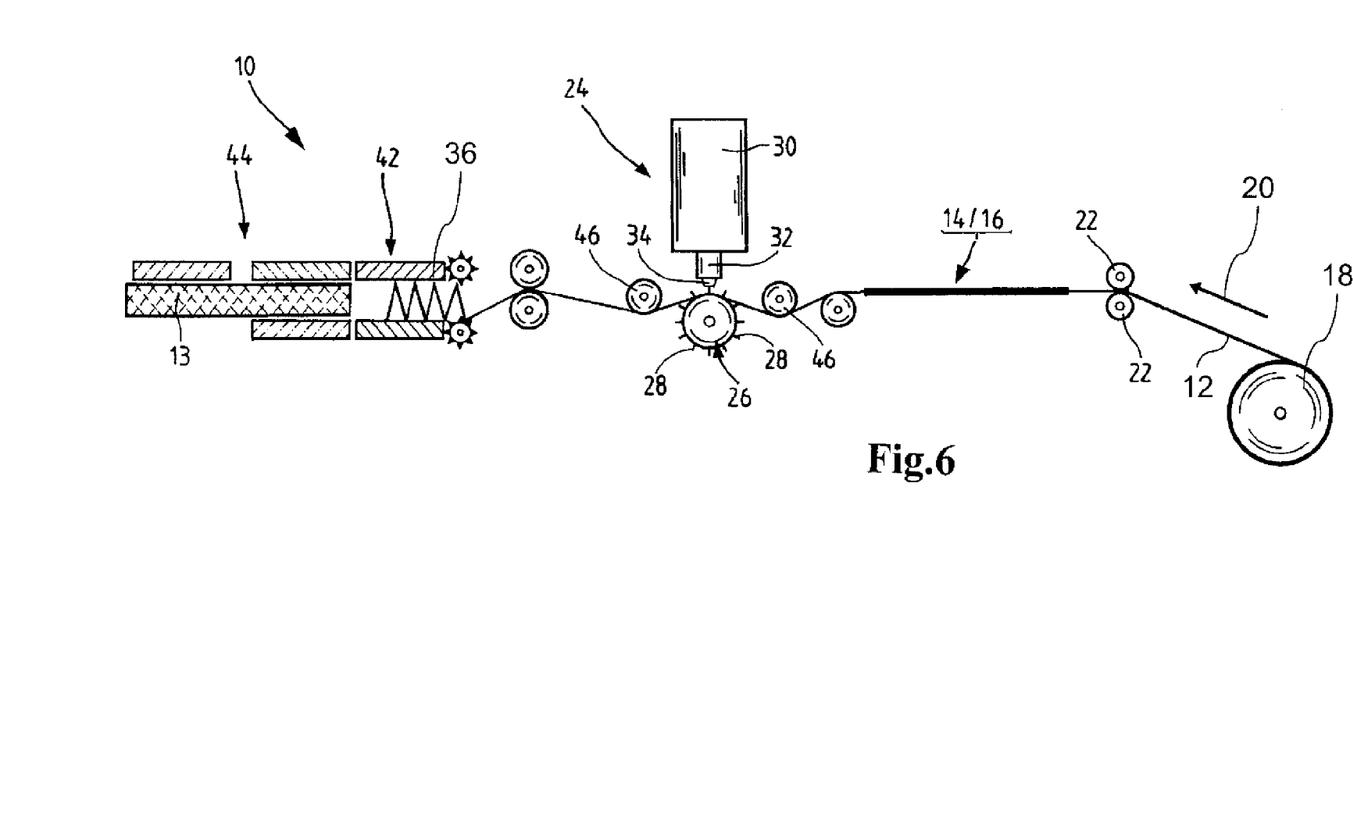
FIG. 6 shows schematically a device according to a second exemplary embodiment for zigzag-shaped folding of the three-layered filter medium web, which device is similar to the first exemplary embodiment of FIG. 1.

In a second embodiment, illustrated in FIG. 6, those elements that are similar to those of the first embodiment described in the FIGS. 1 to 5 are designated by the same reference numerals so that, with regard to the description of these elements, reference is being had to the description of the first exemplary embodiment. This exemplary embodiment differs from the first one in that in the conveying direction 20 upstream and downstream of the anvil roller 26, a rotatingly driven nip roller 46 is additionally arranged in each case, which serves for transporting the filter medium web 12. Here, the deflection rollers 38 and 40 are dispensed with. Moreover, in the second exemplary embodiment, the ultrasonic unit 30 with the sonotrode 32 is located above the anvil roller 26.

The nip rollers 46 are adjustable in terms of their vertical position relative to the anvil roller 26 so that with these nip rollers, an infeed angle and an outfeed angle across the anvil roller 26 can be adjusted. The positions and the speeds of the nip rollers 46 are adjusted depending on the properties of the filter medium web 12 in such a manner that optimal embossing, welding, and folding takes place. For some filter media, non-driven nip rollers can also be of advantage.

Figure 7:
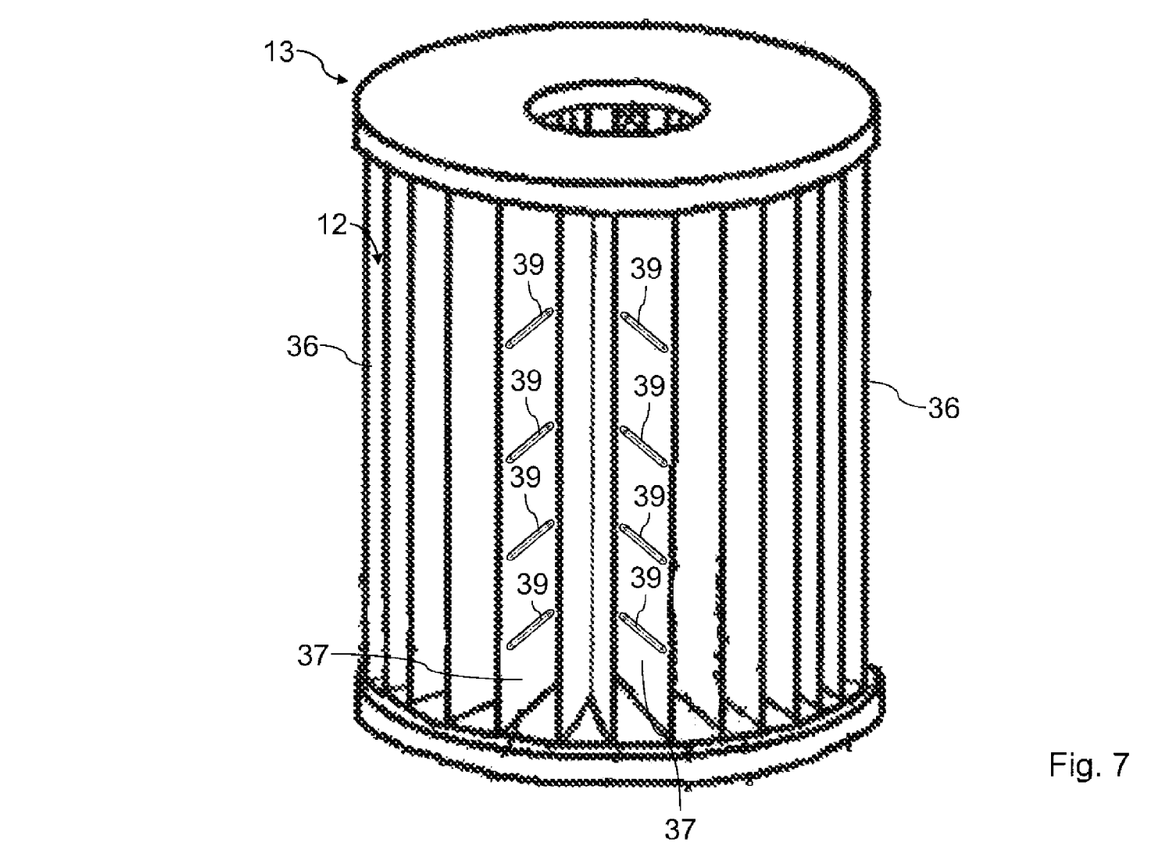
FIG. 7 shows an isometric illustration of a round filter element according to a second exemplary embodiment that is folded in a zigzag shaped-manner and is produced with the device of FIG. 1.

FIG. 7 shows a second exemplary embodiment of a filter element 13. In contrast to the first exemplary embodiment, the filter element 13 in the second exemplary embodiment is configured in the form of a round filter element. The filter medium web 12 of the FIGS. 1 to 3, 8, and 9 is folded here in an annular star-shaped manner and is closed. At each of their front ends, an end disk is arranged, which is not of interest here. Here too, in each flat section 37, a plurality of spacer knobs 39 are arranged, of which only a few are shown in FIG. 7 for the sake of clarity.

Figure 10:
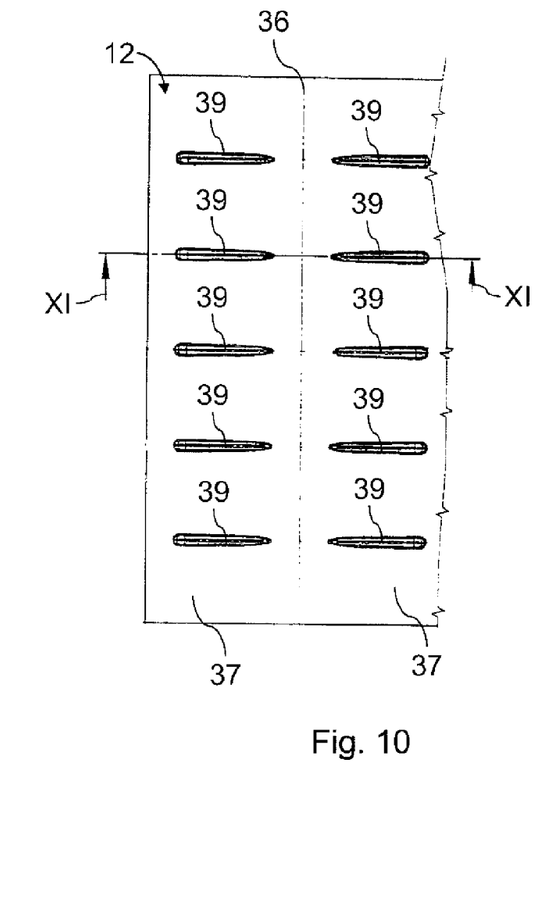
FIG. 10 shows a detail of a filter medium web according to a second exemplary embodiment, which is similar to the filter medium web of FIGS. 1 to 9, in a top view.
Figure 11:
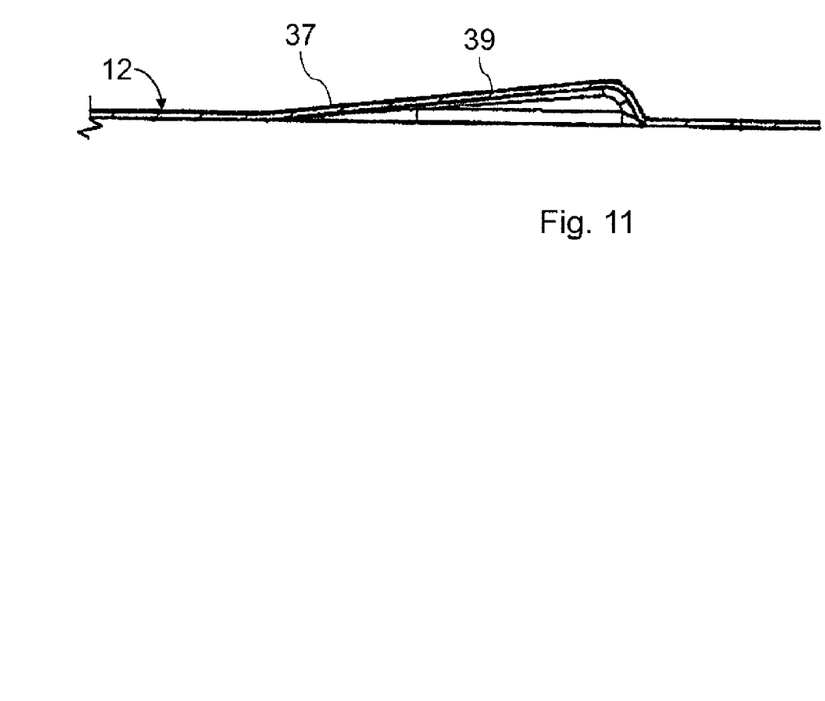
FIG. 11 shows a section of the filter medium web from FIG. 10 along the section line XI-XI in FIG. 10.

FIGS. 10 and 11 show a second exemplary embodiment of a filter medium web 12 in which the spacer knobs 39 have the shape of a half cone shell. The tips of the cones of the spacer knobs 39, which are mirrored at a plane that contains the fold line 36 and is perpendicular to the filter medium web 12 and which rest against each other when the filter medium web 12 is folded, face towards each other. When the filter medium webs 12 are folded, the spacer knobs 39 that correspond to each other rest against each other over their axial length.

In all of the above described exemplary embodiments of a filter element 13, a device 10, and a method for producing a zigzag-shaped folded filter element 13, the following modifications are possible inter alia:

The device 10 and the method are not limited to the production of zigzag-shaped folded filter medium webs 12 for filter elements 13 in the automotive field. Rather, they can also be used in other technical fields, for example, in the industrial sector for filters for industrial motors or compressors, or in water technology.

Instead of using ultrasonic embossing, the layers of the filter medium web 12 can also be embossed and firmly bonded to each other by means of other kinds of energy-introducing methods. Instead of welding the layers together, the layers can also be firmly bonded to each other in a different manner. For example, the layers can also be laminated, calendered, fused or adhesively bonded.

Instead of the ultrasonic embossing unit 24 with a rotating anvil roller 26, a different kind of ultrasonic embossing unit can also be used. For example, a sonotrode that moves together with the filter medium web, or a rotating sonotrode formed on a roller, for example an ultrasonic sonotrode roller, can be used.

Instead of the three-layer filter medium web 12, a filter medium web having more or fewer than three layers can be embossed, firmly bonded, and folded with the device 10 according to the method. For example, a composite of two mesh layers and two meltblown layers can be used.

Instead of the filter medium web 12 having two plastic mesh layers 14 and a meltblown layer 16, other kinds of multi-layered filter medium webs, for example, cellulose media with meltblown laminated thereon, nonwoven with meshes laminated thereon, glass fiber media, for example, laminated glass fiber media with mesh, or air filter nonwoven can also be embossed, firmly bonded, in particular welded, and folded with the device 10. Filter medium webs having at least one layer or ply of a synthetic material can be used. It is also possible that all layers or plies of the filter medium web are made from a synthetic material.

It is also possible to emboss filter medium webs, connected to each other in a preceding work step, by means of the ultrasonic embossing unit 24 along the folding lines 36 and/or along the spacer knobs 39, and to connect them in a stable positive-locking manner, in particular by welding. For example, in the case of a filter medium web consisting of five individual layers, the two meltblown layers can be laminated in such a preceding work step, for example, by means of polyurethane (PUR) hotmelt adhesive applied by spraying. Subsequently, the two plastic meshes can be laminated onto the laminated meltblown layers, for example, by means of PUR hotmelt adhesive.

The two or more layers 14, 16 of the filter medium web 12 can also be unwound separately and can then be loosely pieced together via suitable transport rollers 22.

Instead of arranging spacer knobs in each section 37, it is also possible to arrange corresponding spacer knobs 39 only in every other section 37, which spacer knobs can then rest directly against the fold surfaces of the respective other opposing sections 37 so as to maintain spacing therebetween. The spacer knobs can also have a different shape and/or orientation The spacer knobs 39 within a section 37 can also be alternately raised so that always every other spacer knob 39 in the inflow region and in the outflow region oppose each other.

In addition or as an alternative to the spacer knobs 39, different kinds of functional regions, for example reinforcement webs, can also be embossed and firmly bonded to each other in the sections 37 between adjacent folding lines 36.

The filter medium web 12, for example, can also be heated by means of an infeed heater, for example, for laminating the individual layers, before they are fed to the ultrasonic embossing unit 24.

Embossing and/or firmly bonding the layers 14, 16 along the folding lines 36 can also be completely or partially dispensed with.

The width of the embossing strips 28 in the circumferential direction of the anvil roller 26 can also be greater or less than 1 mm.

The radially outer surfaces of the embossing strips 28 can also be structured instead of being smooth.

In the second exemplary embodiment of the device, non-driven nip roller can also be provided instead of the driven nip rollers 46. It is also possible that only one of the two nip rollers 46 is driven.

While specific embodiments of the invention have been shown and described in detail to illustrate the inventive principles, it will be understood that the invention may be embodied otherwise without departing from such principles.

What is claimed is:

1. A filter element comprising:
   a multi-layered filter medium comprising a plurality of layers and folded along folding lines;
   a first one of the plurality of layers is a plastic mesh configured to absorb traverse forces, the plastic mesh having crossing plastic threads, the crossing plastic threads having a second set of plastic threads crossing a first set of plastic threads at a thread angle of between 70 degrees to 102 degrees;
   a second one of the the plurality of layers is a meltblown layer of meltblown fibers selected from the set of: polybutylene terephthalate (PBT) meltblown, polyamide (PA) meltblown, polypropylene (PP) meltblown and polyether sulfone (PES) meltblown;
   wherein the first and the second layers individual layers lie loosely on top of each other;
   wherein the multi-layered filter medium has at least one functional region in at least one section located between adjacent folding lines, wherein the at least one functional region is a first embossment;
   wherein the layers of the multi-layered filter medium are firmly bonded to each other along the first embossment;
   wherein the at least one functional region is a plurality of spacer knobs or stabilizing knobs formed as half cylinder shell projections into a flat sections of the filter medium between two adjacent fold lines of the filter medium;
   wherein the spacer knobs or stabilizing knobs are embossments into the plurality of layers between two adjacent fold lines of the filter medium, the embossments formed by energy-inducing embossing;
   wherein the folding lines are embossed so that second embossments are formed along the folding lines by energy-introducing embossing and the layers of the multi-layered filter medium are thereby firmly bonded to each other along the second embossments;

wherein between the fold lines and the spacer knobs, the plastic mesh and the meltblown layer are not connected to each other and can still align themselves relative to each other.

2. The filter element according to claim 1, wherein the energy-introducing embossing is ultrasonic embossing.

3. The filter element according to claim 1, wherein the spacer knobs and/or stabilizing knobs rest against mirrored spacer knobs or stabilizing knobs on adjacent flat sections to keep the flat sections of the filter medium spaced apart from each.

4. The filter element according to claim 1, wherein the filter medium is folded in a zigzag shape.

5. The filter element according to claim 1, wherein at least one of the layers of the multi-layered filter medium is comprised of a synthetic material.

6. The filter element according to claim 1, wherein two of the layers of the multi-layered filter medium are comprised of a synthetic material.

7. The filter element according to claim 1, wherein the energy-introducing embossing is ultrasonic embossing.

8. A device for folding a web-shaped multi-layered filter medium of a filter element according to claim 1, the device comprising:
    an energy-introducing embossing unit adapted to emboss the multi-layered filter medium;
    a feed unit feeding the multi-layered filter medium to the embossing unit;
    a folding unit adapted to fold the multi-layered filter medium along folding lines;
    wherein the energy-introducing embossing unit is adapted to emboss and firmly bond layers of the multi-layered filter medium along at least one functional region in at least one section of the multi-layered filter medium located between adjacent folding lines;
    wherein the at least one functional region is a plurality of spacer knobs or stabilizing knobs formed as half cylinder shell projections into a flat sections of the filter medium between two adjacent fold lines of the filter medium;
    wherein the folding lines are embossed so that second embossments are formed along the folding lines by energy-introducing embossing and the layers of the multi-layered filter medium are thereby firmly bonded to each other along the second embossments;
    wherein between the fold lines and the spacer knobs, the plastic mesh and the meltblown layer are not connected to each other and can still align themselves relative to each other.

9. The device according to claim 8, wherein the embossing unit is an ultrasonic embossing unit.

10. A method for producing a zigzag-folded filter element according to claim 1 from a web-shaped multi-layered filter medium, the method comprising:
    feeding the multi-layered filter medium via a feed unit to an energy-introducing embossing unit;
    embossing the multi-layered filter medium with the embossing unit forming fold lines;
    embossing a functional region of a plurality of spacer knobs and/or stabilizing knobs as half cylinder shell projections into the multi-layered filter medium with the embossing unit between two adjacent fold lines of the filter medium;
    folding the multi-layered filter medium along folding lines with a folding device;
    wherein the folding lines are embossed so that second embossments are formed along the folding lines by energy-inducing embossing and the layers of the multi-layered filter medium are thereby firmly bonded to each other along the second embossments.

11. The method according to claim 10, wherein the embossing unit is an ultrasonic embossing unit.

12. The filter element according to claim 1, wherein a third one of the plurality of layers is a plastic mesh configured to absorb longitudinal forces, the plastic mesh having crossing plastic threads, the crossing plastic threads having a second set of plastic threads crossing a first set of plastic threads at a thread angle of between 40 degrees to 80;
    wherein the meltblown layer is arranged between and supported by the first and third plastic mesh layers.

* * * * *